United States Patent
Cilluffo et al.

(10) Patent No.: US 12,281,051 B2
(45) Date of Patent: Apr. 22, 2025

(54) CORROSION INHIBITION OF METAL REINFORCEMENT PRESENT IN A HARDENED CONCRETE CONSTRUCTION HAVING ONE OR MORE SURFACES THAT ARE EXPOSED TO CHLORIDE INTRUSION

(71) Applicant: YARA INTERNATIONAL ASA, Oslo (NO)

(72) Inventors: Giuseppe Cilluffo, Milan (IT);
Wolfram Franke, Skien (NO);
Nikolaos N. Stavroulakis, Chania / Crete (GR)

(73) Assignee: YARA INTERNATIONAL ASA, Oslo (NO)

( * ) Notice: Subject to any disclaimer, the term of this patent is extended or adjusted under 35 U.S.C. 154(b) by 164 days.

(21) Appl. No.: 17/600,809

(22) PCT Filed: Apr. 3, 2020

(86) PCT No.: PCT/EP2020/059485
§ 371 (c)(1),
(2) Date: Oct. 1, 2021

(87) PCT Pub. No.: WO2020/201470
PCT Pub. Date: Oct. 8, 2020

(65) Prior Publication Data
US 2022/0194868 A1     Jun. 23, 2022

(30) Foreign Application Priority Data

Apr. 3, 2019   (EP) .................................. 19166999

(51) Int. Cl.
*C23F 11/18*    (2006.01)
*C04B 14/34*    (2006.01)
*C04B 41/45*    (2006.01)
*C04B 41/50*    (2006.01)
*C04B 41/65*    (2006.01)
*C09K 15/02*    (2006.01)
*C04B 111/26*   (2006.01)

(52) U.S. Cl.
CPC .......... *C04B 41/5009* (2013.01); *C04B 14/34* (2013.01); *C04B 41/4539* (2013.01); *C04B 41/65* (2013.01); *C09K 15/02* (2013.01); *C23F 11/181* (2013.01); *C04B 2111/26* (2013.01)

(58) Field of Classification Search
CPC .......... C23F 11/08; C23F 11/10; C23F 11/12; C23F 11/122; C23F 11/124; C23F 11/18; C23F 11/181; C04B 14/34; C04B 41/009; C04B 41/4535; C04B 41/4539; C04B 41/5009; C04B 41/502; C04B 41/65; C04B 2103/61; C04B 2111/26; C09K 15/02

See application file for complete search history.

(56) References Cited

U.S. PATENT DOCUMENTS

| 4,406,811 A | 9/1983 | Christensen |
| 4,605,572 A * | 8/1986 | Omata ................... C04B 41/009 427/403 |
| 5,422,141 A * | 6/1995 | Hoopes ................. C04B 41/009 427/403 |
| 5,891,364 A * | 4/1999 | Incorvia, Jr. .......... C04B 24/121 252/396 |
| 5,985,011 A * | 11/1999 | Foltz .................... C04B 41/5009 106/14.44 |
| 7,125,441 B1 * | 10/2006 | Furman .................... C23F 11/08 106/14.44 |
| 2003/0075457 A1 | 4/2003 | Buenfeld |
| 2005/0258401 A1 * | 11/2005 | Lane ....................... C04B 7/425 252/387 |
| 2006/0042517 A1 | 3/2006 | Brown |
| 2010/0053236 A1 * | 3/2010 | Ooishi ................. B41M 5/0017 347/6 |

FOREIGN PATENT DOCUMENTS

| CH | 194167 A | 11/1937 |
| CN | 1098352 A | 2/1995 |
| CN | 102757197 A | 10/2012 |
| JP | 2018172951 A | 11/2018 |
| WO | WO-2015059238 A1 * | 4/2015 ........... C04B 41/009 |
| WO | 2017081119 A3 | 6/2017 |

OTHER PUBLICATIONS

Chinese Office Action issued in App. No. CN202080022402.5, dated Mar. 21, 2022, 27 pages.
Youzhu Zhang, et al., Applied Chemistry in Textile, p. 178, Donghua University Press, 1st edition, Aug. 2009.

(Continued)

*Primary Examiner* — Matthew R Diaz
(74) *Attorney, Agent, or Firm* — Dilworth IP, LLC

(57) ABSTRACT

A method for the corrosion inhibition, and optionally rehabilitation, of metal reinforcements present in a hardened concrete construction having one or more surfaces that are exposed to chloride intrusion, wherein the method comprises the step of applying an aqueous alkali metal nitrate solution, an aqueous alkaline earth metal nitrate solution, an aqueous zinc nitrate solution, an aqueous aluminium nitrate solution, an aqueous ammonium nitrate solution or a mixture thereof on one or more of the surfaces. The present disclosure also relates to the use of an aqueous alkali metal nitrate solution, an aqueous alkaline earth metal nitrate solution, an aqueous zinc nitrate solution, an aqueous aluminium nitrate solution, an aqueous ammonium nitrate solution or a mixture thereof as a corrosion inhibitor by applying it on one or more surfaces of hardened concrete construction comprising metal reinforcements that are exposed to chloride intrusion. Furthermore, the present disclosure relates to a corrosion inhibiting composition for inhibition of corrosion of metal reinforcements present in a hardened concrete construction having one or more surfaces that are exposed to chloride intrusion.

13 Claims, 5 Drawing Sheets

(56) References Cited

OTHER PUBLICATIONS

Guangyu Li, et al., Manual of Adhesive Raw Materials, p. 438, National Defense Industry Press, 1st edition, Aug. 2004.
Zhibang Yao, Practical Formula Manual for Building Materials, pp. 97-98, Hehai University Press, 1st edition, May 1991.
European Search Report in related EP19166999.3, dated Sep. 20, 2019, 13 pages.
Extended Search Report in related EP19166999.3, dated Dec. 16, 2019, 12 pages.
International Search Report and Written Opinion in related PCT/EP2020/059485, Jul. 20, 2020, 18 pages.
International Preliminary Report on Patentability in related PCT/EP2020/059485, Mar. 4, 2021, 6 pages.

* cited by examiner

CORROSION INHIBITION OF METAL REINFORCEMENT PRESENT IN A HARDENED CONCRETE CONSTRUCTION HAVING ONE OR MORE SURFACES THAT ARE EXPOSED TO CHLORIDE INTRUSION

TECHNICAL FIELD

The present disclosure relates to the inhibition of corrosion of metal reinforcements present in hardened, also called "set", concrete constructions such as buildings, bridges, roads, etc. (hereafter called "reinforced concrete constructions") having one or more surfaces that are exposed to chloride intrusion inducing corrosion to the metal reinforcements. Corrosion inhibitors are defined as "substances or mixtures that in low concentration and in aggressive environment inhibit, prevent or minimize the corrosion".

BACKGROUND

Concrete constructions for structural purposes such as buildings, bridges, roads, etc. are made out of hardened concrete and are commonly provided inside their core with metal reinforcements in order to strengthen the hardened concrete and to hold the set concrete into compression. Concrete is strong under compression but has a weak tensile strength. The most common form of these metal reinforcements are steel rebars (short for reinforcing bars) and wire mesh. Other types of metal reinforcements are grids, girders, channel beams, and the like. The metal can be in the form of iron and steel. Steel rebars significantly increase the tensile strength of the concrete structure.

Chloride attacks pose a significant threat to reinforced concrete constructions, especially for structures in marine environments or those that are likely to be exposed to high concentrations of salts. The net result of a chloride attack is the corrosion of the metal reinforcement, leading to cracking and spalling of the concrete constructions and in some cases catastrophic structural failure as the load bearing capacity of the concrete is compromised.

The mode of attack originates from salts and other corrosive substances that are carried by moisture, are absorbed into the concrete via its pores and micropores through capillary action. Once absorbed, these substances act to reduce the pH-value of the concrete thereby eliminating its passive oxide layer which would otherwise provide protection to the steel reinforcement. Corrosion takes place as the chloride ions meet with the steel and the surrounding passive material to produce a chemical process which forms hydrochloric acid. The hydrochloric acid eats away at the steel reinforcement.

In wintertime, concrete surfaces of bridges, highways, parking spaces, sidewalks, etc. are exposed to salts such as calcium chloride and sodium chloride that are used to counteract the undesired accumulation of snow and ice. While these chloride salts are beneficiary in terms of de-icing the concrete surfaces of such reinforced concrete constructions, they most often result in the formed chloride solutions migrating into the exposed surfaces thereof. The exposed surfaces can be horizontal as well as vertical (such as walls and columns). Also saline seawater that comes into contact with reinforced concrete structures may intrude into the concrete pores.

A known method for corrosion inhibition of metal reinforcements present inside concrete constructions is to apply calcium nitrite.

In U.S. Pat. No. 6,810,634 for instance, a method is disclosed using calcium nitrite to control corrosion in hydraulic cements that contain metal pieces or structures. The method includes introducing into fresh concrete, containing metal elements, at least one compound capable of sequestering chloride ions.

In U.S. Pat. No. 4,605,572, a method is described for inhibiting corrosion of existing steel material built in an inorganic material such as concrete. The method comprises the step of applying an aqueous solution of an inorganic salt such as calcium nitrite to the surface of the inorganic material.

The disadvantage of calcium nitrite however is that it is toxic for the environment because it can be washed out by rainfall or intrusion by water. The calcium nitrite is also toxic for a worker handling it, consequently leading to health risks. A last disadvantage is that calcium nitrite is expensive to use.

The purpose of the present disclosure is to inhibit the corrosion of concrete comprising reinforcements by impregnation of one or more surfaces of the reinforced concrete construction that are exposed to chloride intrusion causing corrosion of the metal reinforcements with a liquid which is harmless for the environment as well as the health of the worker handling the liquid and which is less costly to apply.

SUMMARY

According to a first aspect of the present disclosure, a method is described for corrosion inhibition of metal reinforcements present in a hardened concrete construction, wherein the method comprises the step of applying an aqueous alkali metal nitrate solution, an aqueous alkaline earth metal nitrate solution, an aqueous zinc nitrate solution, an aqueous ammonium nitrate solution, an aqueous aluminium nitrate solution or a mixture thereof on the one or more surfaces of the reinforced concrete construction that are exposed to chloride intrusion. The aqueous solution does not comprise calcium nitrite ($Ca(NO_2)_2$).

It has surprisingly been found that an aqueous alkali metal nitrate solution or alkaline earth metal nitrate solution, which is less expensive than an aqueous calcium nitrite solution as used in the prior art, and which is furthermore not toxic, is corrosion inhibiting for steel reinforcements embedded in a hardened concrete structure.

It has also been discovered that the aqueous alkali metal nitrate solution or alkaline earth metal nitrate solution penetrates from the surface of the hardened concrete structure to a sufficient depth of the concrete structure to reach the steel reinforcement and to exert the corrosion inhibiting effect. In this way, the corrosion inhibitor needs only to be applied on the surface area located above the steel reinforcement through which less solution needs to be used then when it is applied in the concrete mixture before it is hardened.

It has furthermore been observed that this method according to the present disclosure is leading to long term results.

It is remarked that an additional effect of applying the solutions as mentioned above is that there can be rehabilitation of already corroding metal reinforcements embedded in hardened reinforced concrete structures.

In a possible method according to the present disclosure, an aqueous calcium nitrate solution is applied on one or more of the surfaces comprising between 10 weight % and 20 weight %, more in particular between 15 weight % and 20 weight %, and most in particular around 15 weight % of calcium nitrate dissolved in deionized water.

In an optional method according to the present disclosure, the aqueous solution further comprises between 0.1 weight % to 5.0 weight %, more in particular between 0.5 weight % and 3.0 weight % of a penetration enhancing agent selected from the group consisting of
- ethoxylated linear alcohols, more in particular ethoxylated fatty alcohols with a degree of ethoxylation of more than 10, and more in particular tridecyl alcohol ethoxylates,
- ethoxylated octyl-, nonyl- and dodecyl-phenols with a degree of ethoxylation ranging from 12 to 20,
- secondary alcohol ethoxylates,
- ethoxylated thiols, in particular terdodecyl mercaptan with a degree of ethoxylation ranging from 8 to 10,
- glycerol mono and diesters,
- acetylenic alcohols and diols and alkoxylated acetylenic alcohols and diols,
- N-(alkyloxycarbonyl) alanine, more in particular N-octyl alanine, N-dodecyl alanine, N-hexadecyl alanine and/or N-octadecyl alanine,
- N-alkylated pyrrolidinones, more in particular 1-(C8-C12-alkyl)-2-pyrrolidinone, more in particular 1-octyl-2-pyrrolidinone, 1-dodecyl-2-pyrrolidinone,
- alkyl esters of sulfosuccinic acid, more in particular C14-C18 sulfosuccinate diesters,
- N-acyl sarcosinates, more in particular N-oleyl sarcosine, N-lauroyl sarcosine, N-myristoyl sarcosine and/or N-cocoyl sarcosine, and/or sodium salts thereof.

Such surfactants provide enhanced wetting and penetration capability by altering the surface tension of the composition when it is applied in consecutive coatings on the surface of a hardened concrete construction having metal reinforcements that have undergone or are susceptible to corrosion.

In an optional method according to the present disclosure, the aqueous solution further comprises between 0.1 weight % to 5.0 weight %, more in particular between 1.0 weight % and 2.0 weight % of organic solvent selected from the group consisting of glycol ethers comprising ethylene substituted mono-ethyl, -methyl, -propyl, and -butyl glycol ethers, more in particular ethylene glycol monobutyl ether.

Glycol ethers provide good long-term stability and shelf-life of the aqueous solution as envisaged herein and improve the wetting properties of the water-based solution as envisaged herein.

According to a further aspect of the present disclosure, the use of an aqueous alkali metal nitrate solution, an aqueous alkaline earth metal nitrate solution, an aqueous zinc nitrate solution, an aqueous aluminium nitrate solution, an aqueous ammonium nitrate solution or a mixture thereof as a corrosion inhibitor by applying it on one or more surfaces of a hardened concrete construction comprising metal reinforcements that are exposed to chloride intrusion.

In a possible use according to the present disclosure, an aqueous calcium nitrate solution is applied on the surface of a hardened reinforced concrete construction. The aqueous calcium nitrate solution in particular comprises between 10 weight % and 20 weight %, more in particular between 15 weight % and 20 weight %, and most in particular around 15 weight % of calcium nitrate dissolved in deionized water.

In a particular use according to the present disclosure, the aqueous solution comprises between 0.1 weight % to 5.0 weight %, more in particular between 0.5 weight % and 3.0 weight % of a penetration enhancing agent selected from the group consisting of:
- ethoxylated linear alcohols, more in particular ethoxylated fatty alcohols with a degree of ethoxylation of more than 10, and more in particular tridecyl alcohol ethoxylates,
- ethoxylated octyl-, nonyl- and dodecyl-phenols with a degree of ethoxylation ranging from 12 to 20,
- secondary alcohol ethoxylates,
- ethoxylated thiols, in particular terdodecyl mercaptan with a degree of ethoxylation ranging from 8 to 10,
- glycerol mono and diesters,
- acetylenic alcohols and diols and alkoxylated acetylenic alcohols and diols,
- N-(alkyloxycarbonyl) alanine, more in particular N-octyl alanine, N-dodecyl alanine, N-hexadecyl alanine and/or N-octadecyl alanine,
- N-alkylated pyrrolidinones, more in particular 1-(C8-C12-alkyl)-2-pyrrolidinone, more in particular 1-octyl-2-pyrrolidinone, 1-dodecyl-2-pyrrolidinone, alkyl esters of sulfosuccinic acid, more in particular C14-C18 sulfosuccinate diesters,
- N-acyl sarcosinates, more in particular N-oleyl sarcosine, N-lauroyl sarcosine, N-myristoyl sarcosine and/or N-cocoyl sarcosine, and/or sodium salts thereof.

In a possible use according to the present disclosure, the aqueous solution further comprises between 0.1 weight % to 5.0 weight %, more in particular between 1.0 weight % and 2.0 weight % of organic solvent selected from the group consisting of glycol ethers comprising ethylene substituted mono-ethyl, -methyl, -propyl, and -butyl glycol ethers. More in particular, ethylene glycol monobutyl ether is used.

According to a further aspect of the present disclosure, a corrosion inhibiting composition is described for inhibition of corrosion of metal reinforcements present in a hardened concrete construction having one or more surfaces that are exposed to chloride intrusion, comprising
- between 10 weight % and 20 weight %, more in particular between 15 weight % and 20 weight %, and most in particular 15 weight % of calcium nitrate dissolved in deionized water;
- between 0.1 weight % to 5.0 weight %, more in particular between 0.5 weight % and 3.0 weight % of a penetration enhancing agent selected from the group consisting of:
  - ethoxylated linear alcohols, more in particular ethoxylated fatty alcohols with a degree of ethoxylation of more than 10, and more in particular tridecyl alcohol ethoxylates,
  - ethoxylated octyl-, nonyl- and dodecyl-phenols with a degree of ethoxylation ranging from 12 to 20,
  - secondary alcohol ethoxylates,
  - ethoxylated thiols, in particular terdodecyl mercaptan with a degree of ethoxylation ranging from 8 to 10,
  - glycerol mono and diesters,
  - acetylenic alcohols and diols,
  - alkoxylated acetylenic alcohols and diols,
  - N-(alkyloxycarbonyl) alanine, more in particular N-octyl alanine, N-dodecyl alanine, N-hexadecyl alanine and/or N-octadecyl alanine,
  - N-alkylated pyrrolidinones, more in particular 1-(C8-C12-alkyl)-2-pyrrolidinone, more in particular 1-octyl-2-pyrrolidinone, 1-dodecyl-2-pyrrolidinone,
  - alkyl esters of sulfosuccinic acid, more in particular C14-C18 sulfosuccinate diesters,
  - N-acyl sarcosinates, more in particular N-oleyl sarcosine, N-lauroyl sarcosine, N-myristoyl sarcosine and/or N-cocoyl sarcosine, and/or sodium salts thereof, and between 0.1 weight % to 5.0 weight %, more in particular between 1.0 weight % and 2.0 weight % of organic solvent selected from the group consisting of glycol ethers comprising ethylene substituted mono-ethyl, -methyl, -propyl, and -butyl glycol ethers, more in particular ethylene glycol monobutyl ether.

DETAILED DESCRIPTION

Figure 1:
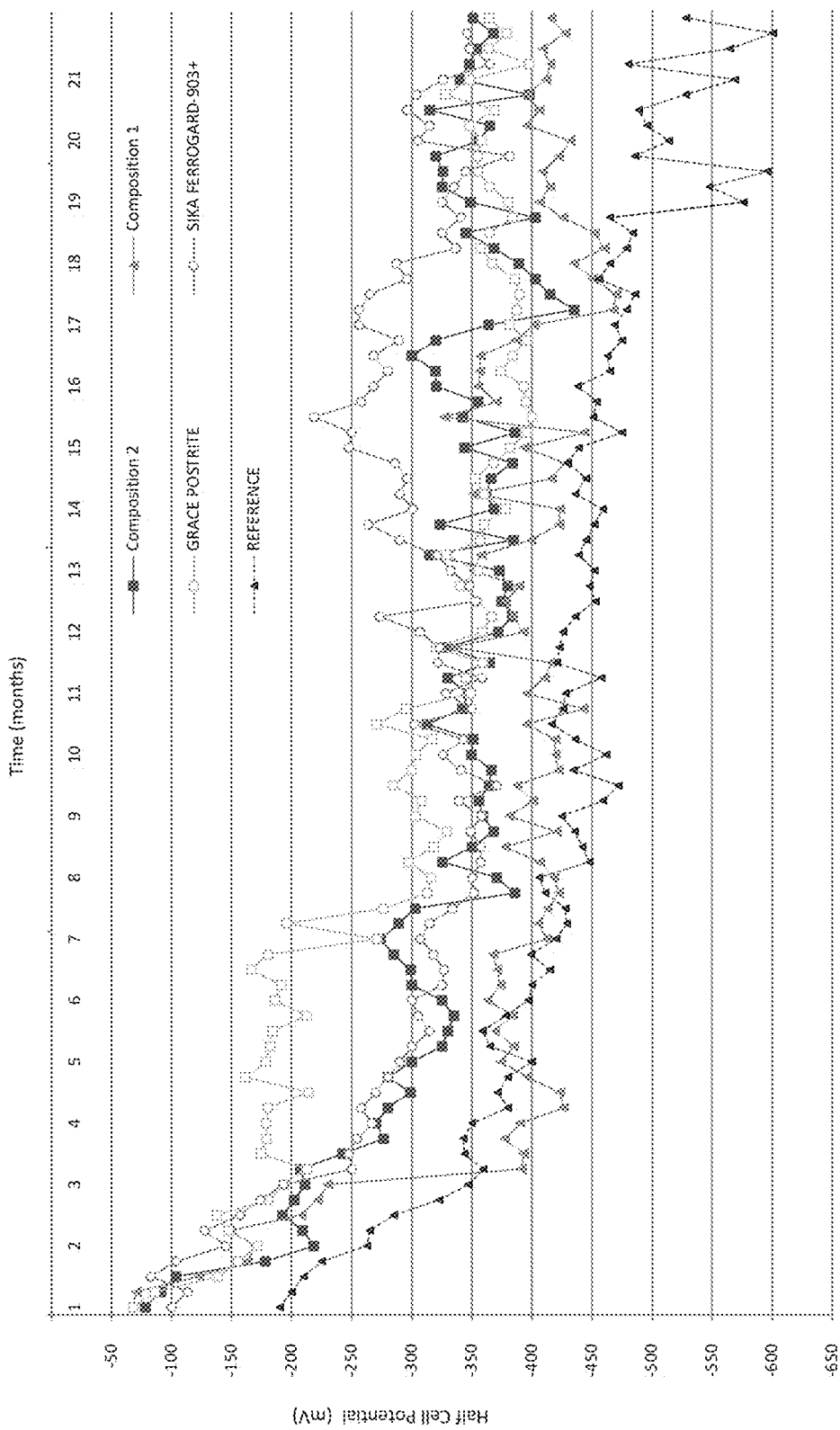
FIG. 1 shows a graph representing the mean values of the half-cell potentials (in µV), versus the time (in days) of concrete specimens with a water/cement ratio of 0.5 (comprising 5 kg/m$^3$ of mix NaCl) that were treated with (corrosion inhibition) composition 1, (corrosion inhibition) composition 2, and the comparative corrosion inhibiting products Grace Postrite and Sika® FerroGard®-903+ and a reference without surface treatment.

The present disclosure relates to a method for the corrosion inhibition of metal reinforcements present in a hardened concrete construction having one or more (outer) surfaces that are exposed to chloride intrusion. Corrosion inhibition is the minimization or prevention of corrosion with a chemical substance (a corrosion inhibitor) when added in small concentrations to an environment. There can however also be an additional effect of rehabilitation of already corroded metal reinforcements.

In this method, an aqueous alkali metal nitrate solution, an aqueous alkaline earth metal nitrate solution, an aqueous zinc nitrate solution, an aqueous aluminum nitrate solution, an aqueous ammonium nitrate solution or a mixture of two or more of these solutions are applied on one or more of the surfaces of the hardened concrete construction that is exposed with chloride intrusion.

More in particular, an aqueous calcium nitrate solution is applied on one or more of these surfaces. The aqueous calcium nitrate solution in particular comprises between 10 weight % and 20 weight % of calcium nitrate dissolved in deionized water. More in particular, between 15 weight % and 20 weight %, and most in particular around 15 weight %. calcium nitrate is dissolved in deionized water.

The aqueous solution can furthermore comprise one or more penetration enhancing agents, also called surfactants and/or co-solvents selected from the group comprising:

ethoxylated linear alcohols, more in particular ethoxylated fatty alcohols with a degree of ethoxylation of more than 10, and more in particular tridecyl alcohol ethoxylates, ethoxylated octyl-, nonyl- and dodecyl-phenols with a degree of ethoxylation ranging from 12 to 20, secondary alcohol ethoxylates, ethoxylated thiols, in particular terdodecyl mercaptan with a degree of ethoxylation ranging from 8 to 10, glycerol mono and diesters, acetylenic alcohols and diols and alkoxylated acetylenic alcohols and diols, N-(alkyloxycarbonyl) alanine, more in particular N-octyl alanine, N-dodecyl alanine, N-hexadecyl alanine and/or N-octadecyl alanine, N-alkylated pyrrolidinones, more in particular 1-(C8-C12-alkyl)-2-pyrrolidinone, more in particular 1-octyl-2-pyrrolidinone, 1-dodecyl-2-pyrrolidinone, alkyl esters of sulfosuccinic acid, more in particular C14-C18 sulfosuccinate diesters, N-acyl sarcosinates, more in particular N-oleyl sarcosine, N-lauroyl sarcosine, N-myristoyl sarcosine and/or N-cocoyl sarcosine, and/or sodium salts thereof.

Examples of such surfactants are 1,4-dimethyl-1,4-bis-(2-methylpropyl-)-2-butyne-1,4-diol ether, polymerized with oxirane, methyl terminated (Surfynol® 2502 from Evonik), 2,4,7,9-tetramethyl-1,5-decyne-4,7-diol (Surfynol® 104 from Evonik), Poly(oxy-1,2-ethanediyl), alpha-[3,5-dimethyl-1-(2-methylpropyl)hexyl]-ω-hydroxy (Tergitol TMN-6 from Croda), Sodium N-Oleyl Sarcosinate (Crodasinic OS35 from Croda).

These surfactants are in particular present between 0.1 weight % to 5.0 weight %, more in particular between 0.5 weight % and 3.0 weight %.

The aqueous solution can furthermore comprise an organic solvent selected from the group consisting of glycol ethers comprising ethylene substituted mono-ethyl, -methyl, -propyl, and -butyl glycol ethers, more in particular ethylene glycol monobutyl ether. Of these, ethylene glycol monobutyl ether is preferred. An example thereof is Butyl Cellosolve Solvent from Dow Chemical.

The organic solvent is in particular present between 0.1 weight % to 5.0 weight %, more in particular between 1.0 weight % and 2.0 weight %.

The present disclosure further relates to the use of an aqueous alkali metal nitrate solution, an aqueous alkaline earth metal nitrate solution, an aqueous zinc nitrate solution, an aqueous aluminum nitrate solution, an aqueous ammonium nitrate solution of a mixture of two or more thereof as a corrosion inhibitor by applying it on one or more surfaces of a hardened concrete construction comprising metal reinforcements that are exposed to chloride intrusion.

The solution can thus be used as a corrosion inhibitor, but can also serve as a corrosion rehabilitator.

In particular, an aqueous calcium nitrate solution is applied. This aqueous calcium nitrate solution comprises between 10 weight % to 20 weight %, more in particular between 15 weight % and 20 weight % and most in particular around 15 weight % of calcium nitrate that is dissolved in deionized water.

The aqueous solution can comprise between 0.1 weight % to 5.0 weight %, more in particular between 0.5 weight % and 3.0 weight % of a penetration enhancing agent selected from the group consisting of
- ethoxylated linear alcohols, more in particular ethoxylated fatty alcohols with a degree of ethoxylation of more than 10, and more in particular tridecyl alcohol ethoxylates,
- ethoxylated octyl-, nonyl- and dodecyl-phenols with a degree of ethoxylation ranging from 12 to 20,
- secondary alcohol ethoxylates,
- ethoxylated thiols, in particular terdodecyl mercaptan with a degree of ethoxylation ranging from 8 to 10,
- glycerol mono and diesters,
- acetylenic alcohols and diols and alkoxylated acetylenic alcohols and diols,
- N-(alkyloxycarbonyl) alanine, more in particular N-octyl alanine, N-dodecyl alanine, N-hexadecyl alanine and/or N-octadecyl alanine,
- N-alkylated pyrrolidinones, more in particular 1-(C8-C12-alkyl)-2-pyrrolidinone, more in particular 1-octyl-2-pyrrolidinone, 1-dodecyl-2-pyrrolidinone,
- alkyl esters of sulfosuccinic acid, more in particular C14-C18 sulfosuccinate diesters,
- N-acyl sarcosinates, more in particular N-oleyl sarcosine, N-lauroyl sarcosine, N-myristoyl sarcosine and/or N-cocoyl sarcosine, and/or sodium salts thereof.

The aqueous solution can furthermore comprise between 0.1 weight % to 5.0 weight %, more in particular between 1.0 weight % and 2.0 weight % of organic solvent selected from the group consisting of glycol ethers comprising ethylene substituted mono-ethyl, -methyl, -propyl, and -butyl glycol ethers, more in particular ethylene glycol monobutyl ether.

The present disclosure also relates to a corrosion inhibiting composition for inhibition of corrosion of metal reinforcements present in a hardened concrete construction having one or more surfaces that are exposed to chloride intrusion. This corrosion inhibiting composition in particular comprises:
- between 10 weight % and 20 weight %, more in particular between 15 weight % and 20 weight %, and most in particular 15 weight % of calcium nitrate dissolved in deionized water;
- between 0.1 weight % to 5.0 weight %, more in particular between 0.5 weight % and 3.0 weight % of a penetration enhancing agent selected from the group consisting of
  - ethoxylated linear alcohols, more in particular ethoxylated fatty alcohols with a degree of ethoxylation of more than 10, and more in particular tridecyl alcohol ethoxylates,
  - ethoxylated octyl-, nonyl- and dodecyl-phenols with a degree of ethoxylation ranging from 12 to 20,
  - secondary alcohol ethoxylates,
  - ethoxylated thiols, in particular terdodecyl mercaptan with a degree of ethoxylation ranging from 8 to 10,
  - glycerol mono and diesters,
  - acetylenic alcohols and diols,
  - alkoxylated acetylenic alcohols and diols,
  - N-(alkyloxycarbonyl) alanine, more in particular N-octyl alanine, N-dodecyl alanine, N-hexadecyl alanine and/or N-octadecyl alanine,
  - N-alkylated pyrrolidinones, more in particular 1-(C8-C12-alkyl)-2-pyrrolidinone, more in particular 1-octyl-2-pyrrolidinone, 1-dodecyl-2-pyrrolidinone,
  - alkyl esters of sulfosuccinic acid, more in particular C14-C18 sulfosuccinate diesters,
  - N-acyl sarcosinates, more in particular N-oleyl sarcosine, N-lauroyl sarcosine, N-myristoyl sarcosine and/or N-cocoyl sarcosine, and/or sodium salts thereof, and
- between 0.1 weight % to 5.0 weight %, more in particular between 1.0 weight % and 2.0 weight % of organic solvent selected from the group consisting of glycol ethers comprising ethylene substituted mono-ethyl, -methyl, -propyl, and -butyl glycol ethers, more in particular ethylene glycol monobutyl ether.

The composition serves as a corrosion inhibiting composition, but can also serve as a corrosion rehabilitation composition.

Experiments

Three hardened steel reinforced concrete specimens with a composition as represented in Table 1 were prepared for every water/cement ratio (0.5 and 0.65) and for every different corrosion inhibitor tested, meaning a total of 6 specimens for every composition. The cement/sand ratio was the same for all specimens, i.e. ⅓. Two different water/cement ratios were tested (i.e. 0.50 and 0.65). 5 kg/m$^3$ of NaCl was added in the water of the concrete mix to enhance corrosion activity. The concrete mix was then casted in cubic molds with a dimension of 100 mm×100 mm×100 mm. 4 rebars were placed in each mould at equal distances from the centre of the specimen. The specimens were fully cured, i.e. they were cured for 3 days at standard conditions (22° C., 50% RH), were then demoulded and cured for further 25 days in water (22° C., 100% RH). The reinforced concrete specimens were properly prepared for the electrochemical measurements and the rebars were insulated with epoxy sealing.

TABLE 1

| Mix designs of the concrete specimens | | |
|---|---|---|
| MATERIAL | kg/m$^3$ | kg/m$^3$ |
| Cement II 42.5N (Lafarge-Holcim) | 525.0 | 525.0 |
| Sand (EN 12620) | 1575.0 | 1575.0 |
| Water | 262.5 | 341.25 |
| NaCl | 5.0 | 5.0 |
| Concrete Mix Characteristics | | |
| Water/Cement ratio | 0.5 | 0.65 |
| Compressive Strength | 16.2 MPa | 15.0 MPa |

The specimens were treated 3 times by applying 0.3 l/m$^2$ of two different corrosion inhibiting compositions (composition 1 and composition 2) as shown in tables 2 and 3 below on one of the surfaces of the specimens.

TABLE 2

| Corrosion Inhibiting Composition 1 (composition 1) | |
|---|---|
| MATERIAL | % by weight |
| Calcium Nitrate | 15.0 |
| Alcoxylated Acetylenic Diol | 0.5 |
| Ethylene Glycol Mono-Butyl Ether | 1.5 |
| Deionized Water | 83.0 |

TABLE 3

| Corrosion Inhibiting Composition 2 (composition 2) | |
| --- | --- |
| MATERIAL | % by weight |
| Calcium Nitrate | 15.0 |
| Acetylenic Diol | 1.0 |
| Ethylene Glycol Mono-Buyl Ether | 1.5 |
| Deionized Water | 82.5 |

In a first test, the ability of the composition to diffuse into the concrete matrix after their surface treatment with composition 1 and composition 2 (or in other words, the depth of penetration) was tested. Each fully cured specimen (as described above) was treated 3 times, once every 6 hours, with 0.3 l/m² of the respective composition. Afterwards, the treated concrete specimens were stored for one week at standard conditions (22° C., 50% RH). In table 4, the measurements of the penetration depth of the nitrates in the treated concrete specimens are shown. These measurements are based on the detection of nitrates in dust samples collected from concrete specimens at different depths. The detection was based on colour reactions of the extracted samples with sulfanilic acid and a-naphthylamine. The final solution absorbs intensively at λ=520 nm and the $NaNO_2$ is evaluated through spectrophotometry. Spectroquant NOVA 60 spectrophotometer was utilized. The results are represented in table 4 below.

TABLE 4

| Measurement of nitrates in the treated concrete specimens | | |
| --- | --- | --- |
| Depth (cm) | Composition1 (nitrates measured in mg/l) | Composition 2 (nitrates measured in mg/l) |
| 0-1 | 3.70 | 4.40 |
| 1-3 | 0.98 | 2.20 |
| 3-4 | 0.38 | 0.77 |
| 4-5 | 0.09 | 0.18 |

Out of the measurements as shown in table 4, it could be concluded that
  both composition 1 and composition 2 penetrate the hardened steel reinforced concrete sufficiently to reach the steel reinforcement, i.e. to a depth of 1-3 cm and 3-4 cm, in this way being able to protect the steel reinforcements against corrosion caused by intrusion of chloride;
  composition 2 achieved a higher penetration than composition 1, especially in the areas where the steel reinforcements are present.

Figure 2:
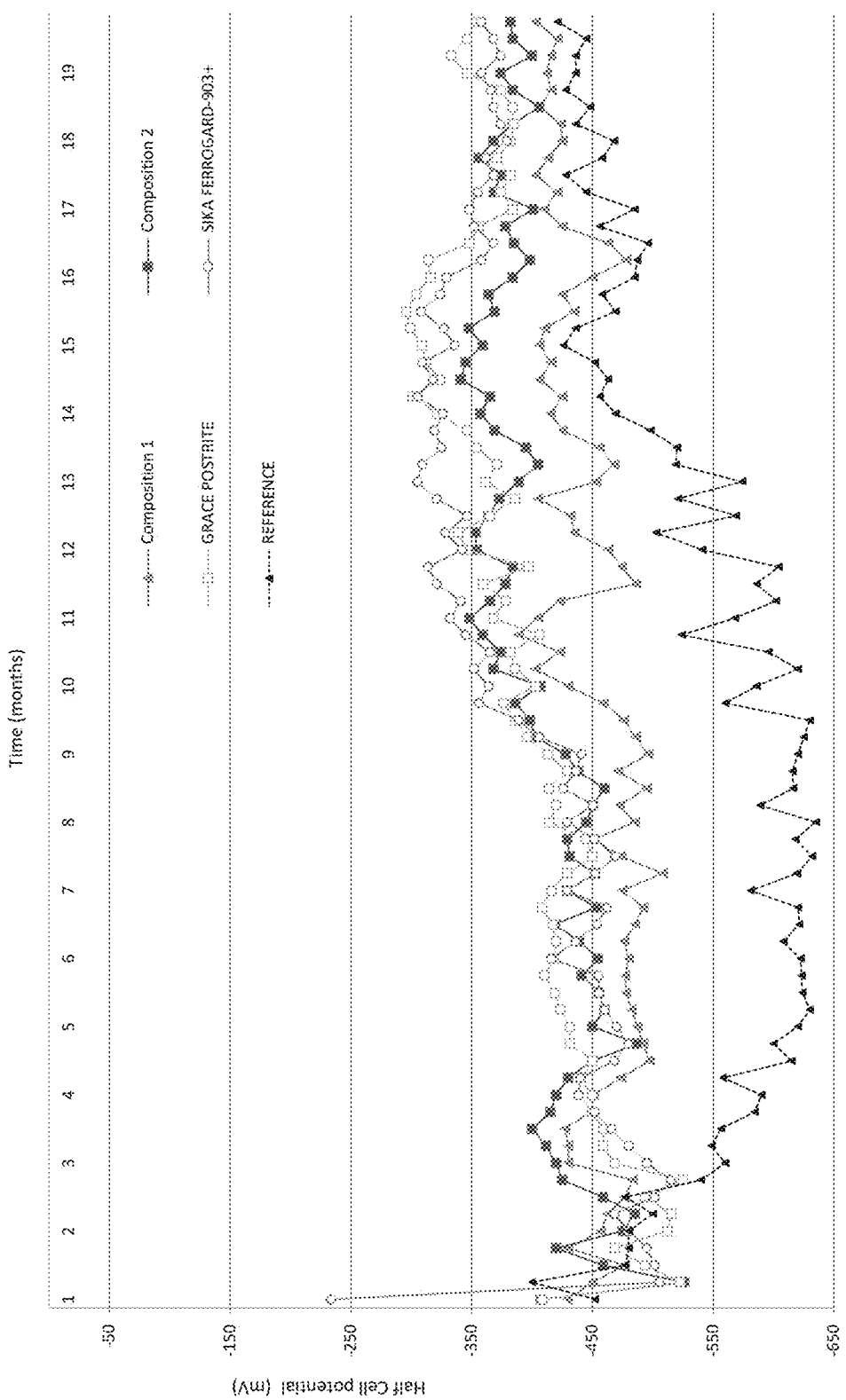
FIG. 2 shows a graph representing the mean values of the half-cell potentials (in µV), versus the time (in days) of concrete specimens with a water/cement ratio of 0.65 (comprising 5 kg/m$^3$ of mix NaCl) that were treated with composition 1, composition 2, and the comparative corrosion inhibiting products Grace Postrite and Sika® FerroGarde-903+ and a reference without surface treatment.
Figure 3:
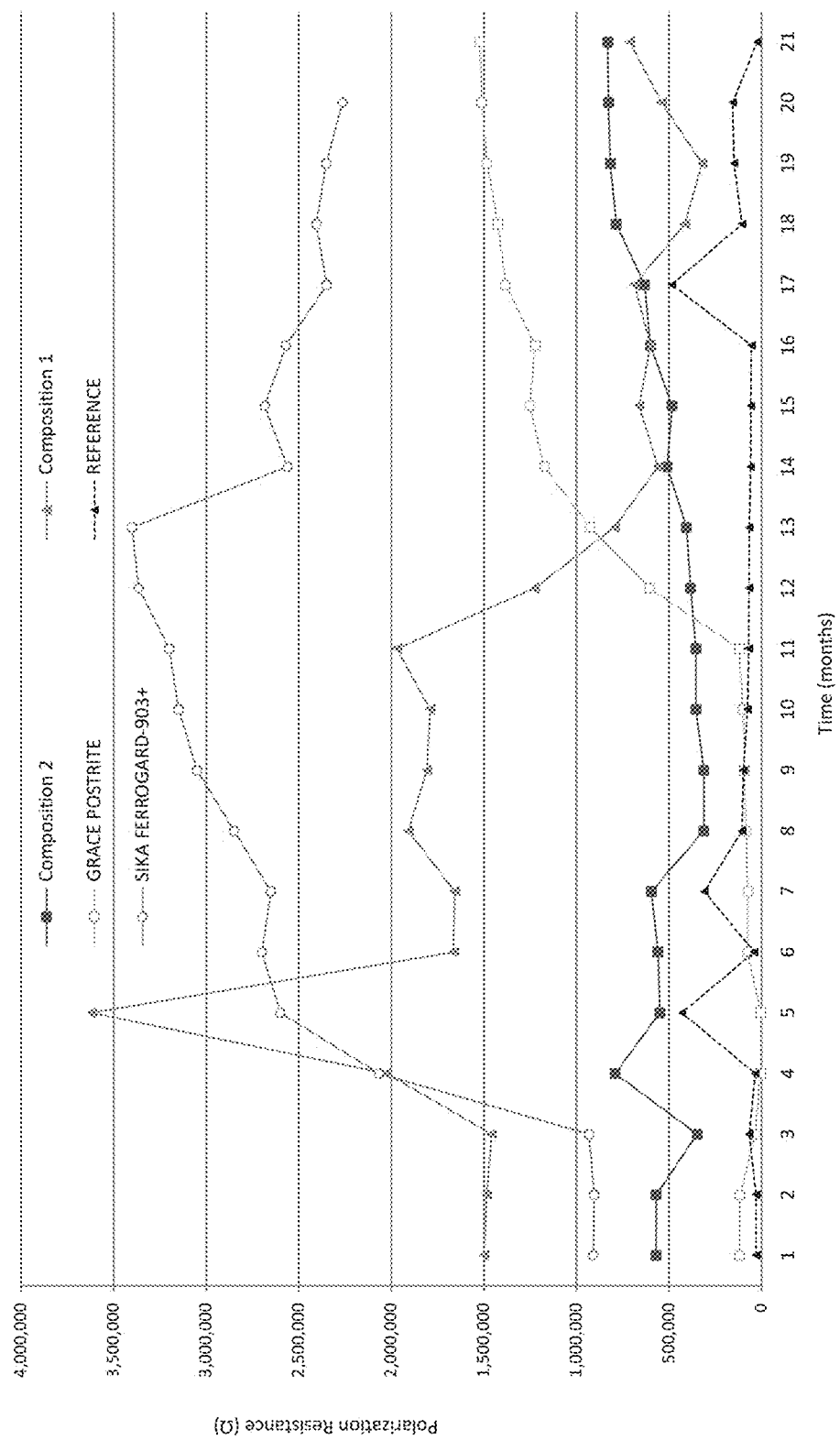
FIG. 3 shows a graph representing the mean values of the polarization resistance (in Ω) versus the time (in days) of concrete specimens with a water/cement ratio of 0.5 (comprising 5 kg/m$^3$ of mix NaCl) that were treated with composition 1, composition 2, and the comparative corrosion inhibiting products Grace Postrite and Sika® FerroGarde-903+ and a reference without surface treatment.
Figure 4:
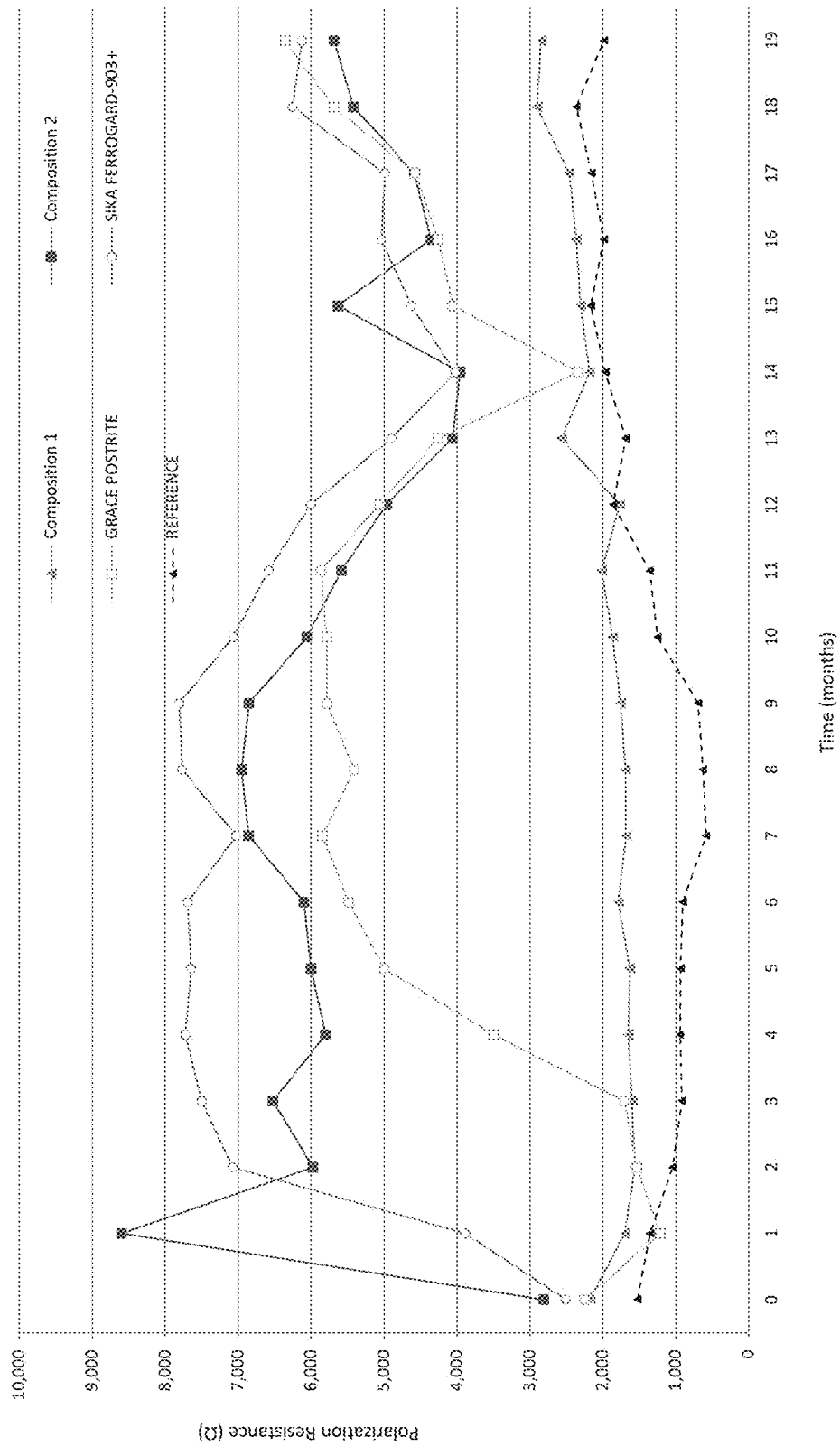
FIG. 4 shows a graph representing the mean values of the polarization resistance (in Ω) versus the time (in days) of concrete specimens with a water/cement ratio of 0.65 (comprising 5 kg/m$^3$ of mix NaCl) that were treated with composition 1, composition 2, and the comparative corrosion inhibiting products Grace Postrite and Sika® FerroGarde-903+ and a reference without surface treatment.

In a second test, the half-cell potentials of concrete specimens treated with the same composition 1 and composition 2 using the electrochemical measurements according to ASTM C876-09 (Standard test method for corrosion potentials of uncoated reinforcing steel in concrete) were measured. This test method covers the estimation of the electrical corrosion potential of uncoated reinforcing steel in field and laboratory concrete, for the purpose of determining the corrosion activity of the reinforcing steel. In FIG. 1, the mean values of the half-cell potentials (in μV), while in FIG. 3, the mean values of the polarization resistance (in Ω) versus the time (in days) of concrete specimens with a water/cement ratio of 0.5 (comprising 5 kg/m³ of mix NaCl) that were treated with composition 1, composition 2, the comparative corrosion inhibiting products Grace Postrite® and Sika® FerroGarde®-903+ and the reference without surface treatment are shown. Postrite® is a liquid containing 15 wt. % calcium nitrite and is available from W. R. Grace Construction Products of Cambridge, Mass. It is applied as an admixture in the fresh concrete. Sika® FerroGarde®-903+ is a surface applied mixed corrosion inhibitor, designed for use as an impregnation of steel reinforced concrete. FerroGarde®-903+ is based on organic compounds, i.e. amino-alcohols and salts of amino-alcohols. Out of FIG. 1, it could be concluded that composition 2 exhibits similar performance with Sika® FerroGarde®-903+. FIG. 3 confirms the conclusion of FIG. 1, while it shows that composition 2 and Grace Postrite® perform similarly. According to FIG. 3, composition 1 actively protects the steel reinforcement, especially during the first 12 months of the test. In FIG. 2, the mean values of the half-cell potentials (in μV), while in FIG. 4, the mean values of the polarization resistance (in Ω) versus the time (in days) of concrete specimens with a water/cement ratio of 0.65 (comprising 5 kg/m³ of mix NaCl) that were treated with composition 1, composition 2, the comparative corrosion inhibiting products Grace Postrite® and Sika® FerroGarde-903+ and the reference without surface treatment are shown. In FIG. 2, it is shown that all the applied corrosion inhibitors perform similarly. composition 2 exhibits similar performance with Sika® FerroGarde®-903+ and Grace Postrite®. FIG. 4 confirms the conclusions as made out of FIG. 2.

In a third test, a group of reinforced concrete specimens was prepared according to the ASTM G109-07 method (Standard test method for determining effects of chemical admixtures on corrosion of embedded steel reinforcement in concrete exposed to chloride environments). This test method covers a procedure for determining the effects of chemical admixtures on the corrosion of metals in concrete. This test method can be used to evaluate materials intended to inhibit chloride-induced corrosion of steel in concrete. The specimens were prepared properly according to the mix-design presented in table 1 with a water/cement ratio of 0.5. 5 kg of NaCl was added per cubic meter of concrete mix in the water to enhance corrosion activity.

In table 5a and 5b below, the corrosion test results according to ASTM G109-07 on reference sample without surface treatment and on samples treated with composition 1, composition 2 and the comparative corrosion inhibiting products Grace DCI®S, Grace Postrite® and Sika® FerroGarde®-903+.

TABLE 5a

| Corrosion test results according to ASTM G109-07 on reference sample without surface treatment and treated samples with composition 1 and composition 2 | | | | | | |
| --- | --- | --- | --- | --- | --- | --- |
| | Reference | | Composition 1 | | Composition 2 | |
| Time (days) | Current (μA) | Total corrosion (Coulomb) | Current (μA) | Total corrosion (Coulomb) | Current (μA) | Total corrosion (Coulomb) |
| 0 | 0.0 | 0.0 | 0.0 | 0.0 | 0.0 | 0.0 |
| 157 | 0.2 | 1.4 | 0.0 | 0.0 | 0.0 | 0.0 |
| 192 | 1.2 | 3.5 | 0.5 | 0.8 | 0.2 | 0.3 |
| 227 | 1.9 | 8.2 | 0.8 | 2.7 | 0.6 | 1.5 |
| 262 | 2.6 | 15.0 | 1.4 | 6.0 | 0.8 | 3.6 |
| 297 | 3.5 | 24.2 | 1.9 | 11.0 | 1.0 | 6.4 |
| 343 | 3.7 | 38.5 | 2.0 | 18.8 | 1.3 | 10.9 |
| 376 | 3.9 | 49.3 | 2.2 | 24.8 | 1.3 | 14.6 |
| 400 | 4.0 | 57.5 | 2.2 | 29.3 | 1.2 | 17.2 |

TABLE 5b

Corrosion test results according to ASTM G109-07 on treated samples with comparative corrosion inhibiting products Grace Postrite ®, Sika ® FerroGard ®-903+ and Grace DCI ®S

| | Grace Postrite ® | | Sika ® FerroGard ®-903+ | | Grace DCI ®S | |
|---|---|---|---|---|---|---|
| Time (days) | Current ($\mu A$) | Total corrosion (Coulomb) | Current ($\mu A$) | Total corrosion (Coulomb) | Current ($\mu A$) | Total corrosion (Coulomb) |
| 0 | 0.0 | 0.0 | 0.0 | 0.0 | 0.0 | 0.0 |
| 157 | 0.0 | 0.0 | 0.0 | 0.0 | 0.0 | 0.0 |
| 192 | 0.2 | 0.3 | 0.1 | 0.2 | 0.2 | 0.3 |
| 227 | 0.6 | 1.5 | 0.4 | 0.9 | 0.6 | 1.5 |
| 262 | 0.9 | 3.8 | 0.5 | 2.3 | 1.0 | 3.9 |
| 297 | 1.4 | 7.3 | 0.7 | 4.1 | 1.7 | 8.0 |
| 343 | 1.4 | 12.8 | 0.9 | 7.3 | 1.6 | 14.6 |
| 376 | 1.3 | 16.7 | 1.0 | 10.0 | 1.7 | 19.3 |
| 400 | 1.3 | 19.4 | 1.0 | 12.0 | 1.5 | 22.6 |

Figure 5:
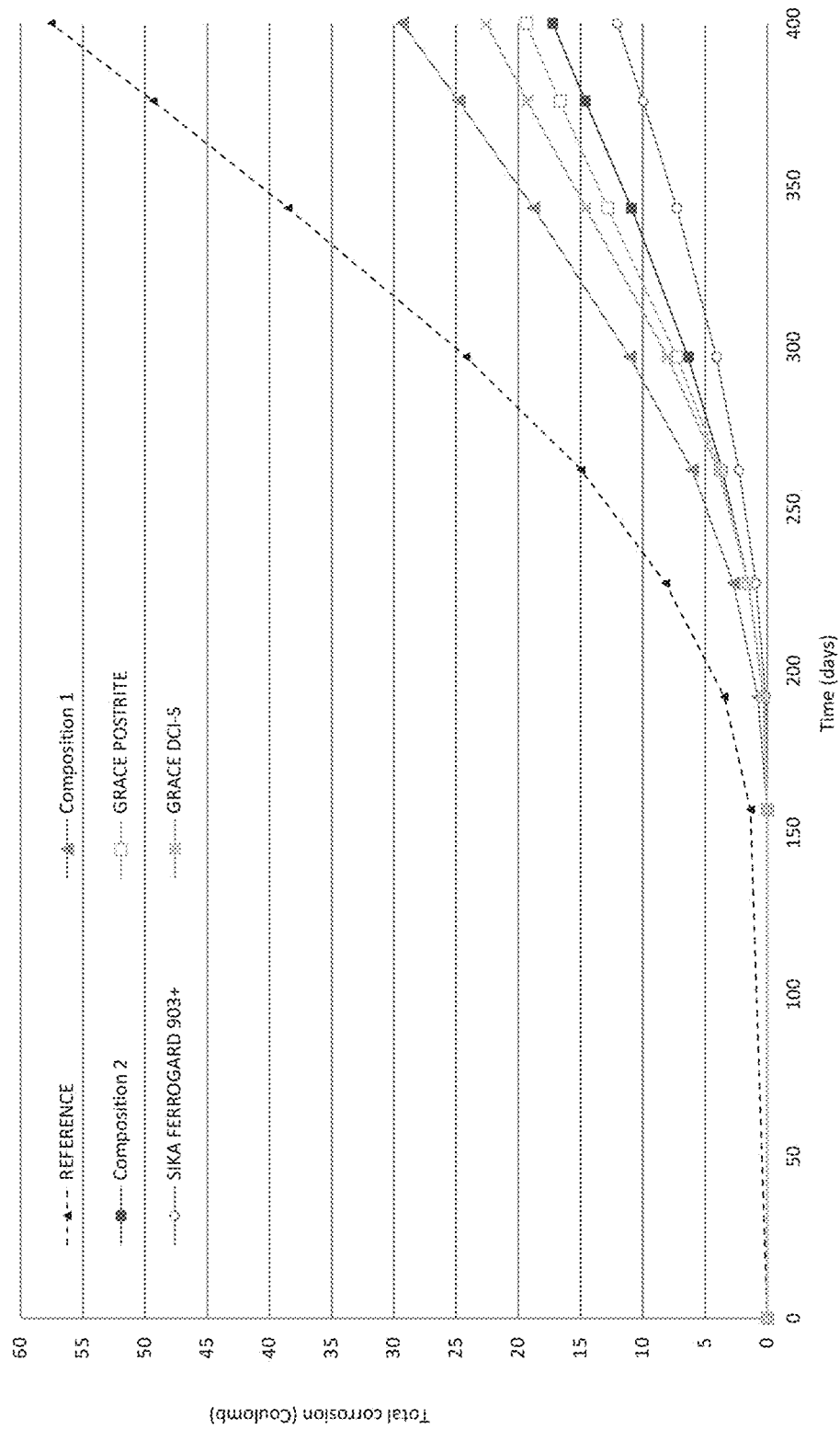
FIG. 5 shows a graph representing the mean values of total integrated current, i.e. total corrosion (in coulomb) versus time (in days) according to the ASTM G-109 for composition 1, composition, and the comparative corrosion inhibiting products Grace Postrite and Sika® FerroGarde-903+, Grace DCI-S and a reference without surface treatment.

In FIG. 5, the mean values of the total integrated current, i.e. total corrosion (in Coulomb) according to the ASTM G109-07 method are shown in view of the time (in days) for composition 1, composition 2, the comparative corrosion inhibiting products Grace DCI®S, Grace Postrite® and Sika® FerroGarde®-903+ and the reference. Grace DCI®S is a liquid corrosion inhibitor that is added to concrete during the batching process. It contains a minimum of 30% calcium nitrite. The principle of the ASTM G109-07-test is "the lower the total integrated current, the less corrosion there is". Out of FIG. 5, it can be concluded that composition 2 performs slightly better than Grace Postrite® and Grace DCI®S. It can furthermore be concluded that surface applied corrosion inhibiting composition 2 delays the onset of corrosion of the steel reinforcement embedded in reinforced concrete constructions more effectively than corrosion inhibiting compositions that are applied as admixtures in concrete mix during the batching process, e.g. Grace DCI®S.

The invention claimed is:

1. A method for the corrosion inhibition of metal reinforcements present in a hardened concrete construction having one or more surfaces that are exposed to chloride intrusion, wherein the method comprises the step of applying an aqueous solution on the one or more surfaces, the aqueous solution consisting of:
   (a) 90 to 99.8 wt % of an aqueous nitrate solution selected from an aqueous alkali metal nitrate solution, an aqueous alkaline earth metal nitrate solution, an aqueous zinc nitrate solution, an aqueous aluminium nitrate solution, an aqueous ammonium nitrate solution or a mixture thereof;
   (b) 0.1 to 5.0 wt % of a glycol ether organic solvent selected from ethylene substituted mono-ethyl glycol ether, ethylene-substituted mono-methyl glycol ether, ethylene- substituted mono-propyl glycol ether or ethylene-substituted mono-butyl glycol ether; and
   (c) 0.1 to 5.0 wt % of a penetration enhancing agent selected from the group consisting of ethoxylated linear alcohols, ethoxylated octyl-, nonyl-and dodecyl-phenols with a degree of ethoxylation ranging from 12 to 20, secondary alcohol ethoxylates, ethoxylated thiols, glycerol mono and diesters, acetylenic alcohols and diols and alkoxylated acetylenic alcohols and diols, N-(alkyloxycarbonyl) alanine, N-acyl sarcosinates, N-alkylated pyrrolidinones, alkyl esters of sulfosuccinic acid, N-octyl alanine, N-dodecyl alanine, N-hexadecyl alanine, N-octadecyl alanine, and mixtures thereof.

2. The method according to claim 1, wherein the aqueous alkaline earth metal nitrate solution is an aqueous calcium nitrate solution in deionized water wherein the calcium nitrate concentration is 10-20 wt % based on the total weight of the solution.

3. The method of claim 2 wherein the calcium nitrate concentration is 15-20 wt %, based on the total weight of the solution.

4. The method of claim 1 wherein the glycol ether organic solvent is ethylene glycol monobutyl ether.

5. The method of claim 1 wherein the glycol ether organic solvent is present in the aqueous solution from 1.0 weight % to 2.0 weight %.

6. The method of claim 1 wherein the concentration of the penetration enhancing agent in the aqueous solution is between 0.5 weight % and 3.0 weight %.

7. The method of claim 1 wherein the ethoxylated linear alcohols are ethoxylated fatty alcohols with a degree of ethoxylation of more than 10.

8. The method of claim 7 wherein the ethoxylated fatty alcohol with a degree of ethoxylation of more than 10 is a tridecyl alcohol ethoxylate.

9. The method of claim 1 wherein the ethoxylated thiols is a terdodecyl mercaptan with a degree of ethoxylation ranging from 8 to 10.

10. The method of claim 1 wherein the penetration enhancing agent is at least one of N-octyl alanine, N-dodecyl alanine, N-hexadecyl alanine and N-octadecyl alanine.

11. The method of claim 1 wherein the N-alkylated pyrrolidinones are selected from 1-(C8-C12-alkyl)-2-pyrrolidinones.

12. The method of claim 11 wherein the N-alkylated pyrrolidinones are 1-octyl-2-pyrrolidinone or 1-dodecyl-2-pyrrolidinone.

13. The method of claim 1 wherein the N-acyl sarcosinate is selected from at least one of N-oleyl sarcosine, N-lauroyl sarcosine, N-myristoyl sarcosine, N-cocoyl sarcosine and sodium salts thereof.

* * * * *